United States Patent
Kinstler

(10) Patent No.: US 7,464,901 B2
(45) Date of Patent: Dec. 16, 2008

(54) METHOD AND DEVICE FOR MAGNETIC SPACE RADIATION SHIELD

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 11/046,401

(22) Filed: Jan. 28, 2005

(65) Prior Publication Data
US 2006/0169489 A1    Aug. 3, 2006

(51) Int. Cl.
*B64G 1/52*    (2006.01)
*H05K 9/00*    (2006.01)
*H01F 6/00*    (2006.01)

(52) U.S. Cl. ............... 244/171.7; 335/216; 335/301; 174/353; 174/391

(58) Field of Classification Search .......... 174/353, 174/391, 396; 335/216, 301; 244/171.7, 244/171.8
See application file for complete search history.

(56) References Cited

U.S. PATENT DOCUMENTS

| 3,224,375 | A | * | 12/1965 | Hoff ................. 244/159.1 |
| 3,378,691 | A | * | 4/1968 | Swartz ................. 307/91 |
| 5,012,217 | A | * | 4/1991 | Palkovich et al. ......... 335/301 |
| 6,977,571 | B1 | * | 12/2005 | Hollis et al. ............ 335/216 |

OTHER PUBLICATIONS

Nancy Atkinson; *Riding in Magnetic Bubbles*; Astrobiology Magazine: Search for Life in the Universe; http://www.astrobio.net/news/article1342.html (visited Jan. 28, 2005).
Richard Reifsnyder; *Radiation Hazards on a Mars Mission*; The Martian Chronicles; Issue 8, Winter 2001; The Mars Society Youth Chapter; http://chapters.marssociety.org/youth/mc/issue8/radiation.php3 (visited Jan. 28, 2005).
*Study of Magnetospheric Propulsion (eMPii)*; Space Environment and Effects Section; Contracts Final Presentation Feb. 19-20, 2004.
Jeffrey A. Hoffman, Peter Fisher and Oleg Batishchev; *Use of Superconducting Magnet Technology for Astronaut Radiation Protectioon*; Final Report for NIAC Phase I Contract CP 04-01; May 2, 2005; pp. 1-38; Massachusetts Institute of Technology, Cambridge, Massachusetts.

* cited by examiner

*Primary Examiner*—Ramon M Barrera
(74) *Attorney, Agent, or Firm*—Alston & Bird LLP

(57) ABSTRACT

There is provided a radiation shield device for providing radiation protection to an area, such as a manned vehicle. The radiation shield device comprises a magnetic field generator, such as a solenoid, of superconductive material that provides a magnetic field around the area to shield the area from radiation. The solenoid preferably defines an axial length that is substantially smaller than a diameter of the solenoid. A thermal control system, comprising a limited amount of coolant or a refrigeration cycle, is included to control a temperature of the superconductive material during operation of the magnetic field generator. A magnetic shield device is also provided between the magnetic field generator and the area to be shielded from radiation to substantially shield the area from the magnetic field generated by the magnetic field generator.

24 Claims, 8 Drawing Sheets

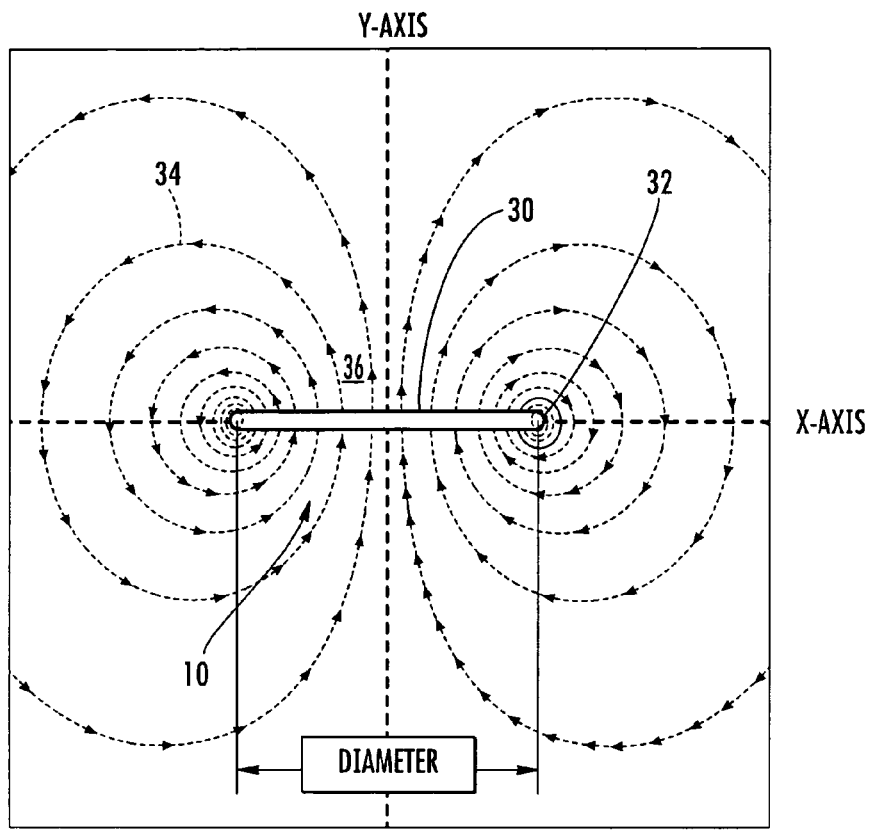
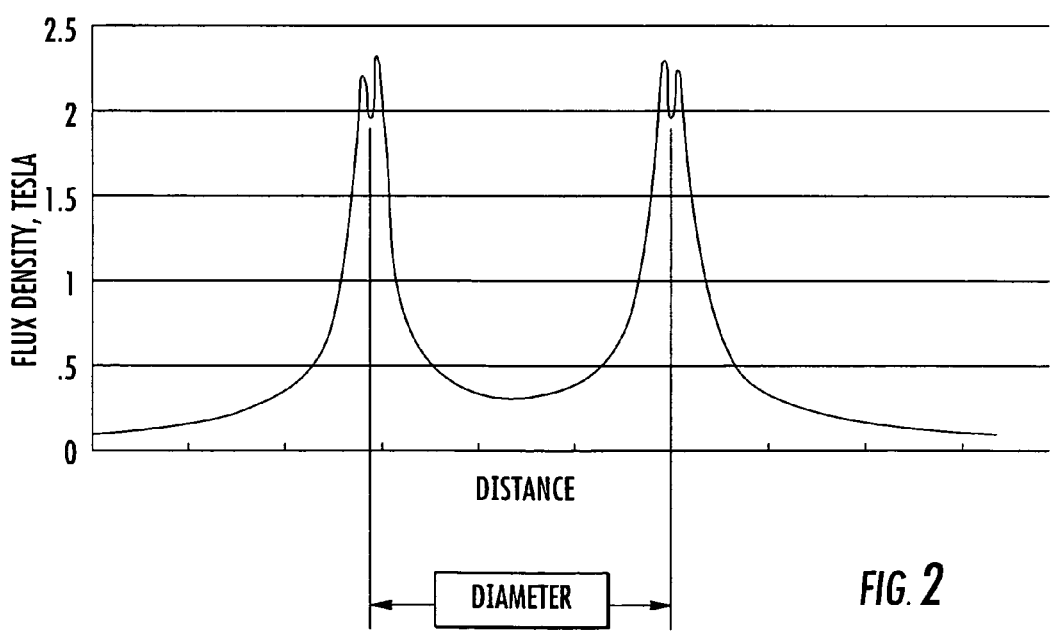
FIG. 2

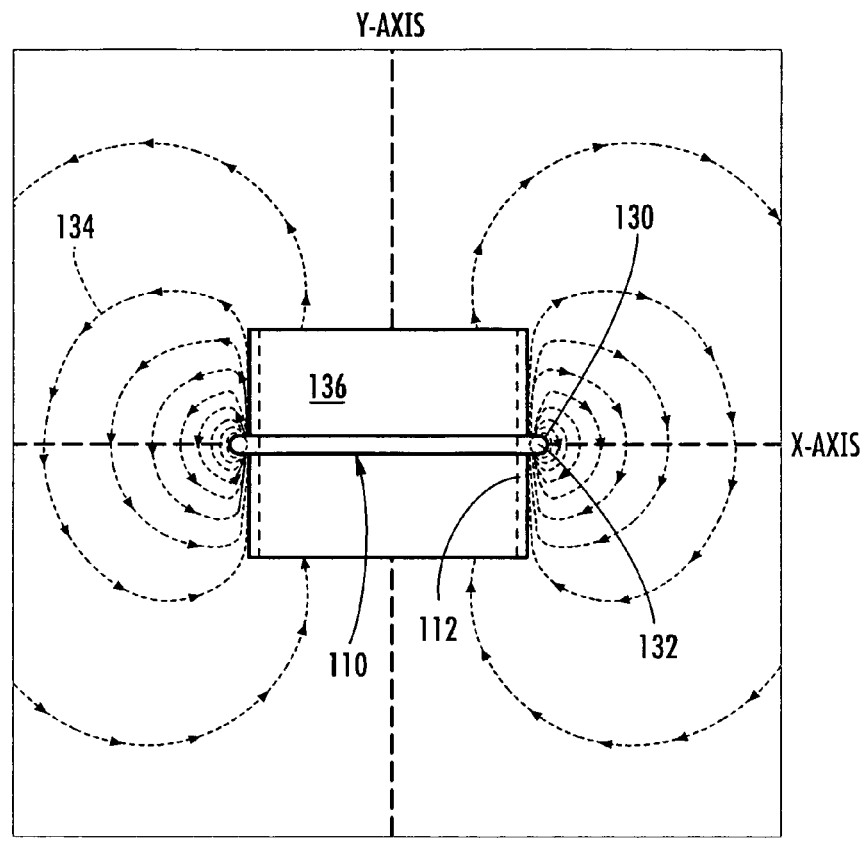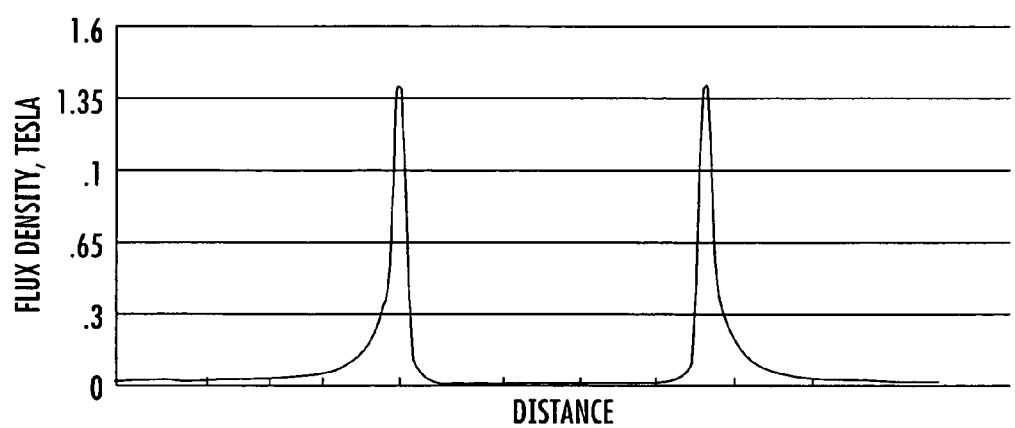
FIG. 5

METHOD AND DEVICE FOR MAGNETIC SPACE RADIATION SHIELD

BACKGROUND OF THE INVENTION

1. Field of the Invention

The present invention is related to radiation shielding, and more particularly, to a magnetic field generator of superconductive material for radiation protection.

2. Description of Related Art

The sun occasionally releases significant amounts of charged particles during events known as coronal mass ejectas ("CMEs"). The charged particles released during CMEs include electrons, protons, and heavy ions. Such proton and heavy ion radiation can cause severe cell damage when humans are exposed to such radiation. Additionally, sensitive electronic components and other devices may be adversely affected by such radiation. Therefore, even though CMEs are relatively uncommon occurrences, the amounts of radiation they could potentially inflict upon a crew and equipment of a spacecraft gives rise for a need to shield part or all of such spacecraft from such radiation. Similarly, a need exists for radiation protection in other environments as well, such as habitats for celestial bodies such as the moon and Mars.

Shielding from proton and heavy ion radiation may generally be accomplished by either absorbing the particles or by deflecting the particles. To absorb the radiation, materials of a thickness sufficient for the amount of energy expected from the radiation, can be provided around an area that houses the crew and/or sensitive equipment during a CME. However, because of the significant amount of weight such a housing would require, the use of radiation absorbing material is not practical for space exploration and other applications. Additionally, the absorption of high energy particles releases a different form of radiation such as gamma rays and X-rays that pass through the shielding material and may harm the crew and/or equipment.

Therefore, it is generally preferred to deflect the particles of radiation rather than absorb them. One example of effective deflection of CME radiation is the earth's magnetosphere which creates a magnetic field of enough flux density to change the trajectory of such radiation particles from the sun or elsewhere, thus causing the radiation to be diverted away from the earth. Therefore, it would be desirable to create an artificial magnetosphere around an area, such as a spacecraft crew compartment, that required shielding from such radiation. However, because of the need to minimize the weight and energy consumption of spacecrafts, systems for creating such an artificial magnetosphere, for even a relatively brief period of time, such as a day or two, have not been practical based upon the amount of material and/or energy required.

A need therefore exists for a radiation shield that is relatively light weight and that requires relatively little energy. If such a radiation shield deflects the radiation using a magnetic field, a need additionally exists for also shielding the area from the magnetic field that is generated by the radiation shield.

BRIEF SUMMARY OF THE INVENTION

The invention addresses the above needs and achieves other advantages by providing a radiation shield device for protecting an area from radiation. The radiation shield device includes a magnetic field generator of superconductive material that provides a magnetic field around the area to shield the area from radiation. In some embodiments of the invention, the magnetic field generator is a solenoid comprising a coil of magnesium diboride embedded in a copper wire. The magnetic field generated preferably has a magnetic flux density between 0.5 to 10 Tesla. To cool the superconductive material to a desired temperature, the radiation shield device also comprises a thermal control system, which in some embodiments of the invention may be either an open loop system including a coolant of liquid helium or liquid neon or a closed loop refrigeration cycle.

The radiation shield device also includes a magnetic shield device for substantially shielding the area from the magnetic field generated by the magnetic field generator. Preferably, the magnetic shield device comprises a layer of high magnetic permeability material disposed between the magnetic field generator and the area to be shielded from radiation. Therefore, the radiation shield device of one embodiment of the present invention shields an area from radiation from CMEs and other sources, while also providing protection from the magnetic field that provides a shield to the radiation.

Further embodiments of the present invention include a radiation shield device having a solenoid of superconductive material for providing a magnetic field around the area to shield the area from radiation, wherein the solenoid defines an axial length that is substantially smaller than a diameter of the solenoid. The solenoid of superconductive material preferably provides a magnetic field having a magnetic flux density of 0.5 to 10 Tesla. The superconductive material of the solenoid may be a coil of magnesium diboride embedded in a copper wire that comprises at least 1,000,000 Ampere-turns. The radiation shield device also includes a thermal control system for controlling a temperature of the superconductive material.

The present invention also provides methods for manufacturing a radiation shield device. A solenoid of superconductive material is installed around the area to be shielded from radiation, such that the solenoid defines an axial length that is substantially smaller than, or less than 25% of, the diameter. A thermal control system, such as an open loop or closed loop system, is provided in thermal communication with the superconductive material to enable the temperature of the superconductive material to be maintained within a predetermined temperature range during subsequent operation of the radiation shield device. The method of manufacturing may also include positioning a magnetic shield device between the solenoid of superconductive material and the area to be shielded from radiation. In addition, a radiation detection device and processing circuitry for controlling the orientation of the solenoid of superconductive material relative to detected radiation are provided to enable improved performance of the radiation shield device.

The present invention thus provides protection from radiation exposure to people and/or equipment within a spacecraft or other structures. The radiation shield device preferably has a minimal weight while requiring minimal energy to operate, thus making it feasible to utilize in applications where weight and energy consumption are critical parameters. Additionally, the radiation shield device also provides protection from the magnetic field that is generated to deflect the particles of radiation.

BRIEF DESCRIPTION OF THE SEVERAL VIEWS OF THE DRAWINGS

Figure 1:
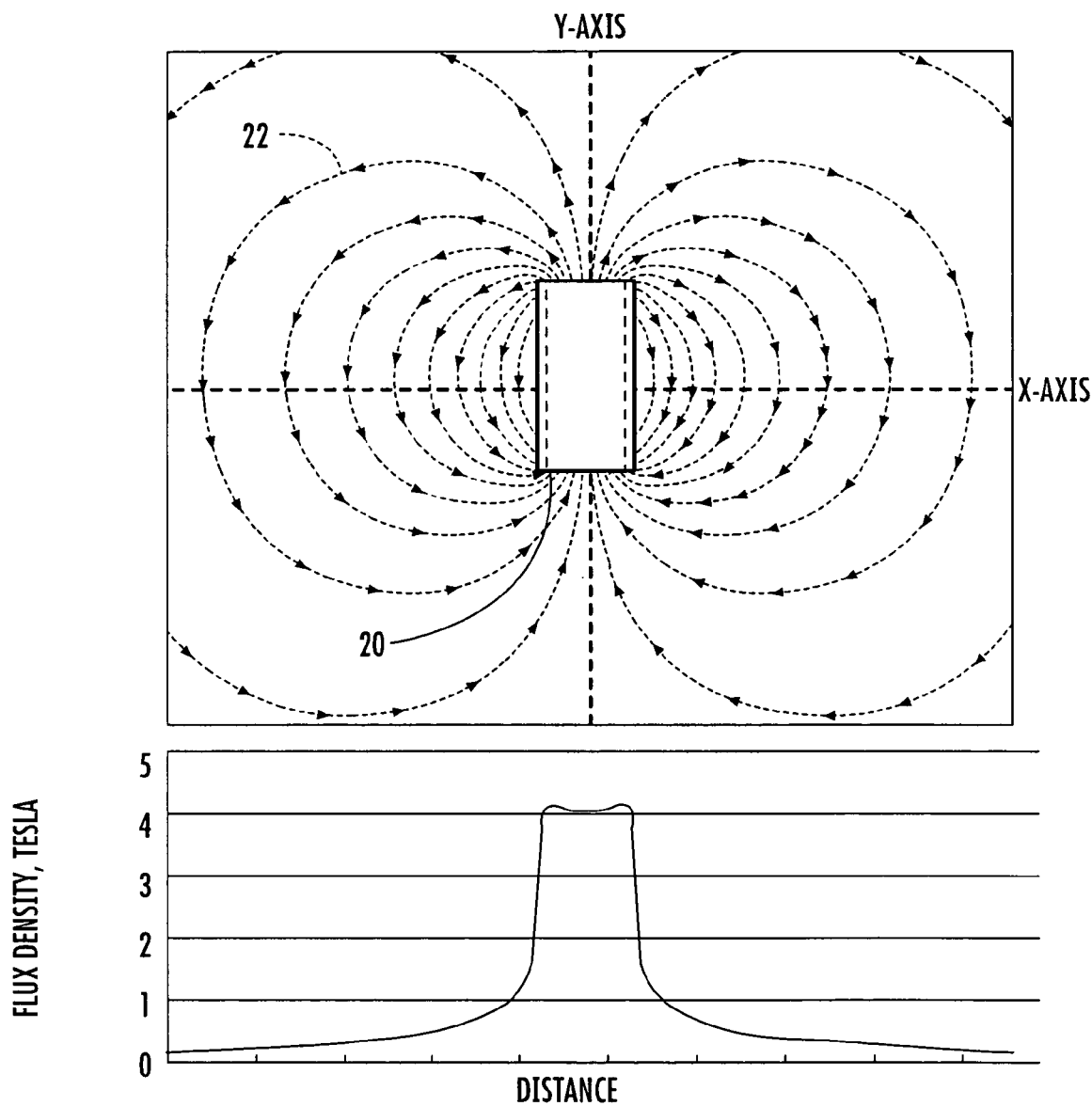
Figure 3:
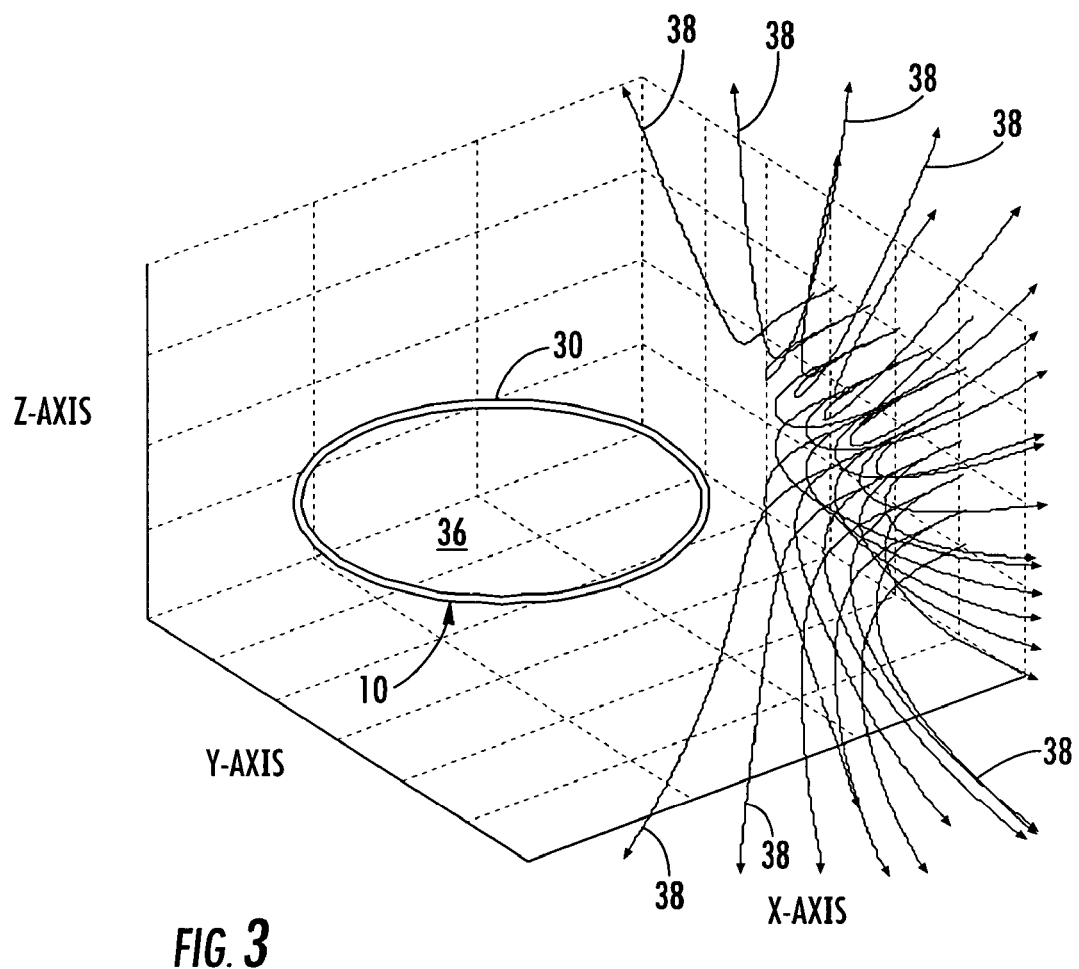
Figure 4:
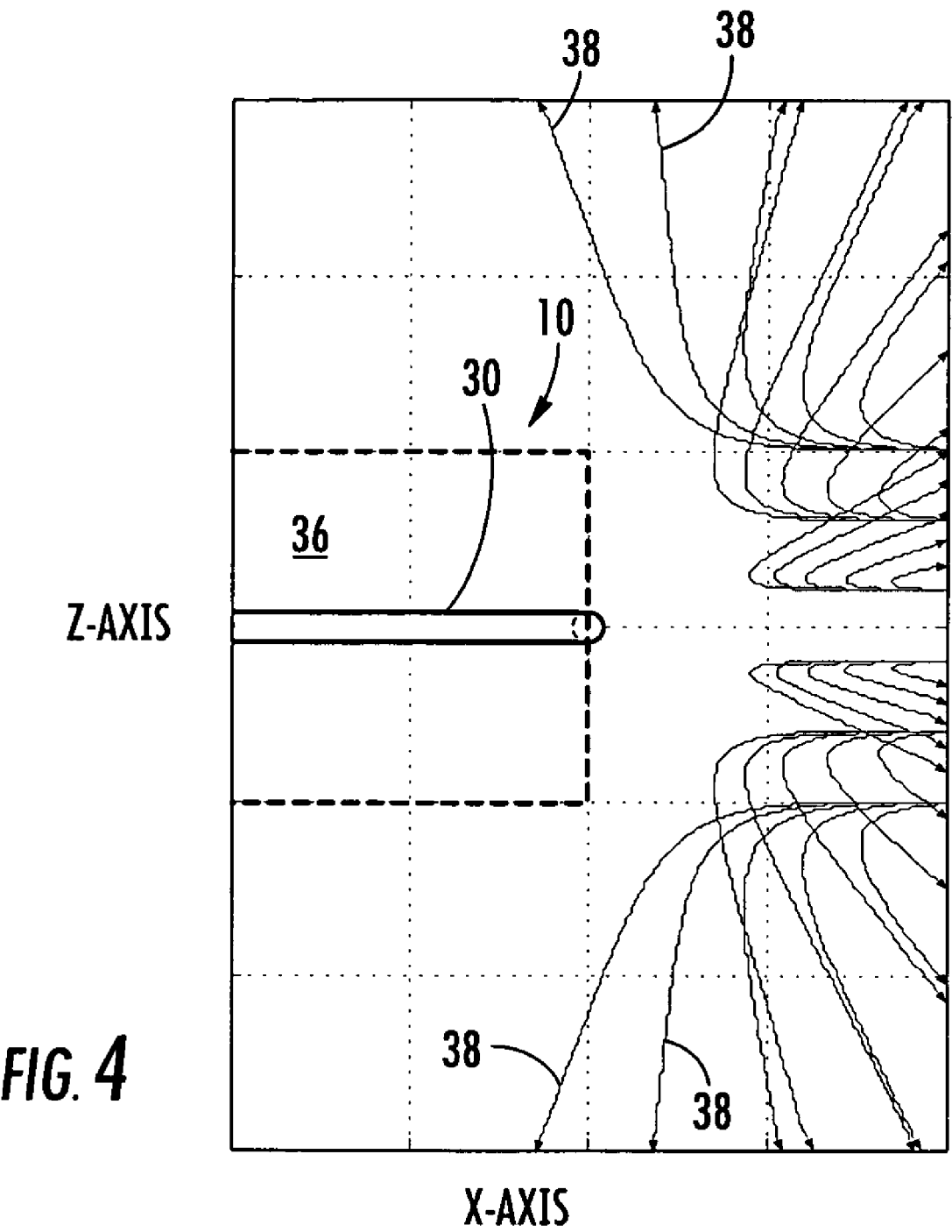
Figure 6:
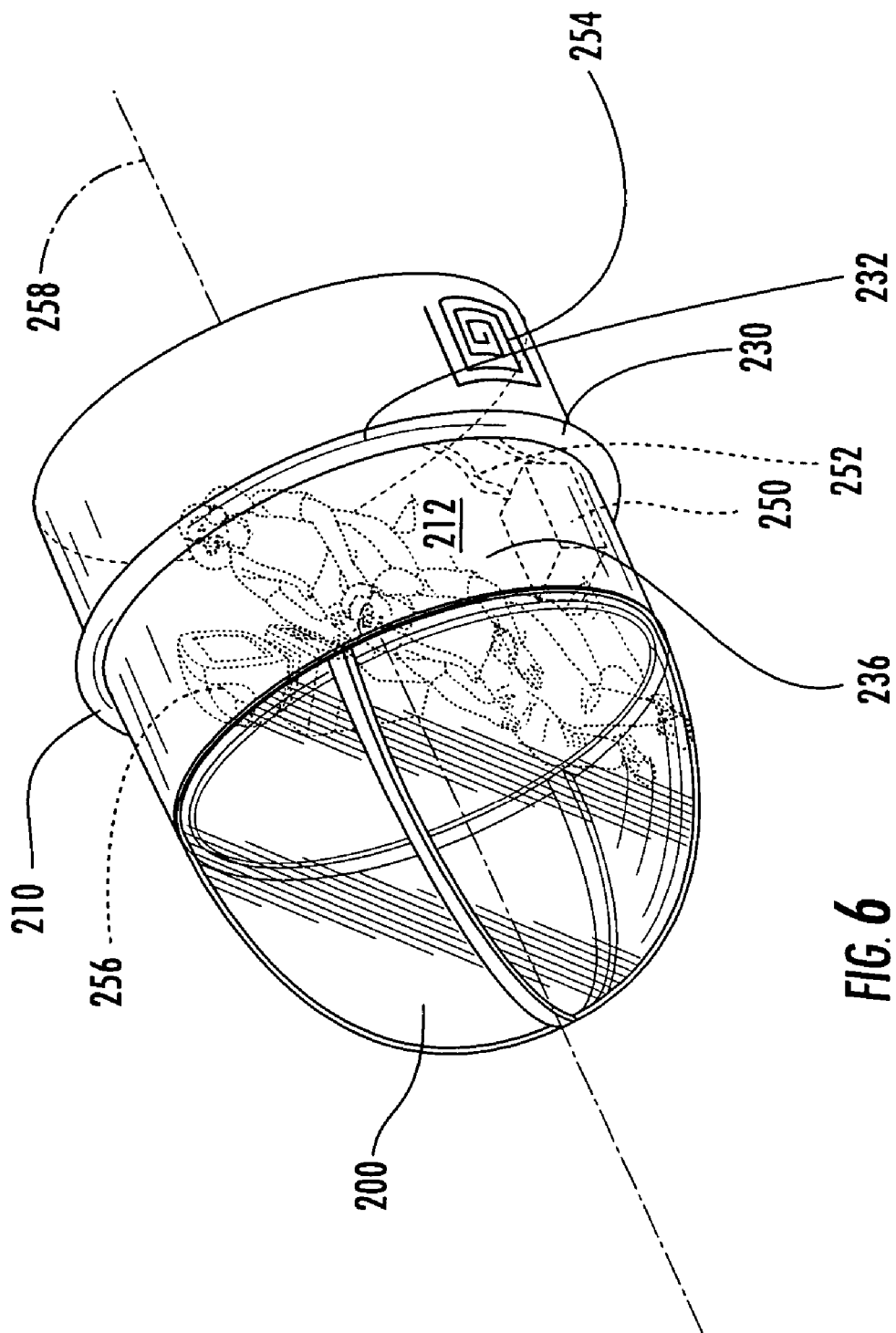
Figure 7:
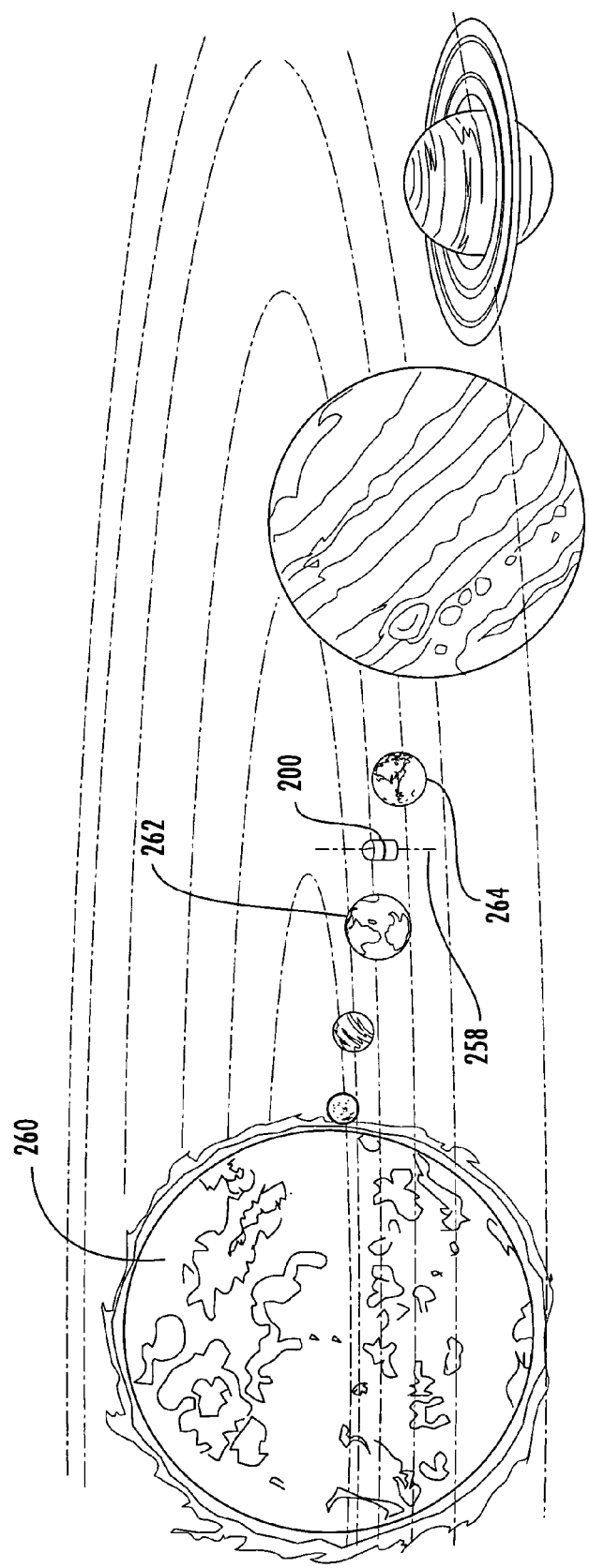
Figure 8:
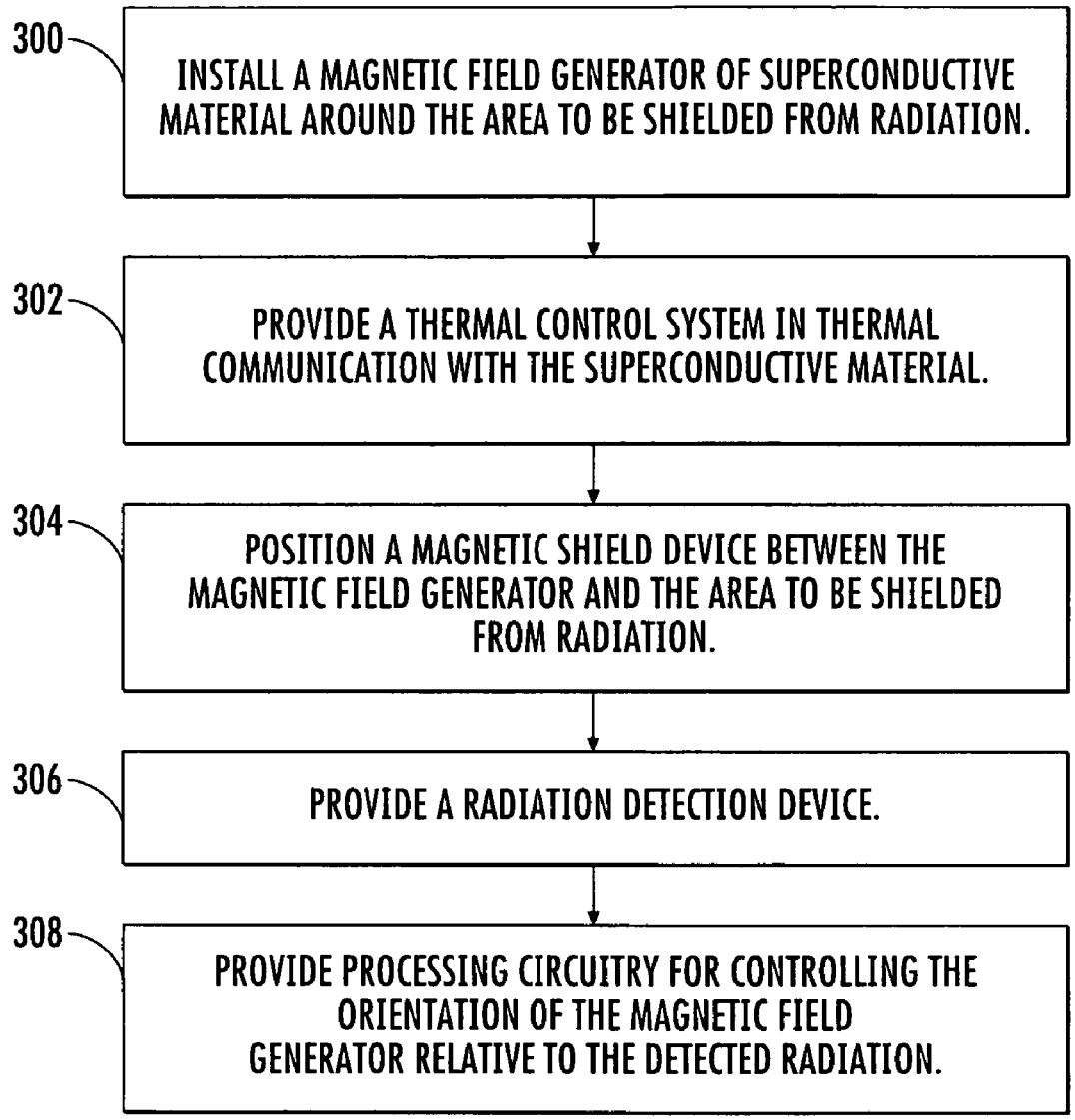

Having thus described the invention in general terms, reference will now be made to the accompanying drawings, which are not necessarily drawn to scale, and wherein:

FIG. 1 is a side cross-sectional view of a prior art solenoid, illustrating the magnetic flux lines and representing the magnetic flux density of the magnetic field as a function of distance across the solenoid;

FIG. 2 is a side cross-sectional view of a magnetic field generator of one embodiment of the present invention, illustrating the magnetic flux lines and representing the magnetic flux density of the magnetic field as a function of distance across the magnetic field generator;

FIG. 3 is a perspective representation of the magnetic field generator of FIG. 2, illustrating the paths of multiple particles of radiation that are deflected away from the left side of the magnetic field generator;

FIG. 4 is a side elevational view of FIG. 3, further illustrating the paths of deflected particles of radiation and showing an area that is shielded from radiation;

FIG. 5 is a side cross-sectional view of a magnetic field generator of a second embodiment of the present invention having a magnetic shield device, illustrating the magnetic flux lines and representing the magnetic flux density of the magnetic field as a function of distance across the magnetic field generator;

FIG. 6 is a perspective view of a radiation shield device of a third embodiment of the present invention, illustrating the position of the magnetic field generator and magnetic shield device relative to the area on a spacecraft that is substantially shielded from radiation;

FIG. 7 is a perspective, environmental view of the spacecraft of FIG. 6, illustrating one preferred orientation of the radiation shield device relative to the sun; and FIG. 8 is a flowchart of steps for manufacturing a radiation shield device according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 2-6, a radiation shield device in accordance with one embodiment of the present invention is illustrated. The radiation shield device 10 of FIGS. 2-6 is described herein as providing protection from radiation for a manned space vehicle or a habitat for celestial bodies, particularly during CME events. However, further embodiments of the present invention comprise radiation shield devices for any situation where protection from particle radiation is desired both within and beyond the earth's atmosphere under any circumstance.

Reference will now be made to the prior art solenoid 20 of FIG. 1 illustrating a coil of conductive, or superconductive, material and representing the magnetic flux lines of the magnetic field 22 generated by the solenoid when an electrical current is passed through the solenoid, as known in the art. Solenoids typically define an axial length of material that is at least as long in an axial direction as the diameter is wide in a radial length. Furthermore, multiple solenoids may be provided to define a toroid that generates a single magnetic field, as known in the art. Referring again to FIG. 1, a representation of the magnetic flux density in relation to a radial distance is illustrated. For the solenoid 20 of FIG. 1, the magnetic flux density within the area encircled by the solenoid, and immediately contiguous thereto, is approximately 4 Tesla for FIG. 1, and quickly tapers off as the distance from the solenoid increases, to less than 1 Tesla for FIG. 1. Therefore, prior art solenoid structures could provide protection against particle radiation from such sources as CMEs, but the amount of material necessary for a prior art solenoid is very weight prohibitive for certain uses, such as for spacecraft.

Referring now to the radiation shield device 10 of FIG. 2, the radiation shield device comprises a magnetic field generator 30 having superconductive material 32 for providing a magnetic field 34 around an area 36 to shield the area from radiation, such as protons and heavy ions. The magnetic field generator 30 of FIGS. 2-4 is a solenoid comprising a coil of superconductive material; however, further embodiments of the present invention comprise magnetic field generators defining alternative configurations of the superconductive material. The magnetic field generator 30 illustrated in FIG. 2, provides a magnetic field 34 of approximately 2 Tesla, near the coil of superconductive material 32 and of approximately 0.5 Tesla, within and beyond the coil of superconductive material, to give non-limiting examples of magnetic flux densities. Therefore, the magnetic field generator of FIG. 2 provides a magnetic field 34 having a flux density of approximately 2 Tesla. The magnetic field generator of the present invention preferably provide magnetic fields having a magnetic flux density of 0.5 to 10 Tesla, more preferably between 1 and 8 Tesla, and most preferably between 2 and 5 Tesla. The amount of magnetic flux density provided by the magnetic field generator is predetermined based upon the energy of the particles that the radiation shield device is intended to shield against, as described more fully below.

Referring again to FIGS. 2-4, the magnetic field generator 30 defines a solenoid having an axial length that is substantially smaller than a diameter of the solenoid. For the illustrated embodiment of FIGS. 2-4, the solenoid defines a diameter of approximately 4 meters and an axial length, in the direction of the y-axis, of less than 1 meter, to list one non-limiting example. It has been discovered that increases in the axial length of the solenoid do not significantly increase the volume of area that is shielded from radiation, presuming equivalent magnetic flux densities. Therefore, a solenoid having an axial length that is substantially smaller than the diameter, specifically less than 25% of the diameter, is preferred for reasons of form factor and manufacturability. Further embodiments of the present invention include solenoids having alternative relationships between the axial length and diameter. Still further embodiments of the present invention include magnetic field generators that define shapes other than circular, such as multi-dimensional shapes such as spherical or two-dimensional shapes such as ellipses or polygons, to list non-limiting examples, that provide sufficient radiation protection for the area around which the magnetic field generator is disposed. Specifically, the magnetic field generator is considered to be around the area if it encircles a part or all of the area in one or more dimensions. Therefore, if the area to be shielded is generally rectangular in cross-section, to define one non-limiting example, the solenoid comprises a generally rectangular shape around the area and is preferably embedded within the structure defining the area to minimize the volumetric space occupied by the magnetic field generator. FIG. 6 provides an illustration of one embodiment of the present invention that is circular and included along the outer surface of the spacecraft, as described more fully below.

The deflection of particle radiation is partially represented in FIGS. 3 and 4. FIG. 3 shows the approach of multiple particles 38 from various points along the x-axis, y-axis, and z-axis and the various angles of deflection caused by the magnetic field that is represented in FIG. 2. The magnetic field generator 30 is preferably oriented such that the axis of the magnetic field is generally perpendicular to the oncoming particle radiation 38 so that greater radiation protection is provided. A side view of FIG. 3 is provided in FIG. 4, which shows the various trajectories of some of the particles 38 approaching from the left side (from the perspective of the approaching particle). The area 36 shielded from the particle radiation is also illustrated in FIG. 4. For the embodiment of FIGS. 2-4, the area protected from particle radiation generally defines the same diameter as the magnetic field generator and generally defines an axial length that is approximately half the diameter of the magnetic field generator, such as 2 meters for the illustrated embodiment. The relative dimensions of the axial length and diameter of the protected area is in part based upon the magnetic flux density of the magnetic field generated by the radiation shield device because of the relatively larger and more extended magnetic flux densities provide areas of protection with relatively greater axial length.

The particles 38 illustrated in FIGS. 3 and 4 represent proton radiation from the sun during a CME, wherein the protons define an energy of approximately 20 MeV. The radiation shield device 10 of the present invention preferably shields the area 36 from radiation particles defining an energy up to 50 MeV, and more preferably up to 100 MeV. Therefore, the radiation shield device of the present invention protects the area 36 from substantially all direct particle radiation, while also precluding indirect radiation (gamma rays, X-rays, or the like) that would be created if the particle radiation were absorbed.

The magnetic field generator 30 of the present invention comprises superconductive material 32 to enable the generator to generate a magnetic field 34 of a preferred magnetic flux density while requiring relatively little electrical energy. The superconductive material 32 of the illustrated magnetic field generators 30 comprises a coil of magnesium diboride ($MgB_2$) embedded in a copper wire/sheath, as known in the superconductive art. Preferably, the wire comprises at least 30% magnesium diboride (i.e., a fill factor of 30%), more preferably at least 40%, and most preferably at least 50% magnesium diboride. The magnesium diboride of the illustrated embodiments is preferably doped with approximately 10% SiC to improve the magnetic field generating capability of the magnesium diboride. Further embodiments of the present invention include alternative superconductive materials, provide alternative ratios of superconductive material-to-sheathing, and comprise alternative amounts and materials for doping the superconductive material.

To have superconductive properties, the material 32 must be at a temperature below its critical superconducting temperature onset level and as close to absolute zero as possible, preferably 40°K. or lower, more preferably less than 25°K., and most preferably less than 10°K. The radiation shield device 10 of the illustrated embodiments preferably comprises a thermal control system in thermal communication with the superconductive material to lower the temperature of the superconductive material to a desired temperature. The thermal control system of the illustrated embodiments is preferably an open loop system that includes a predetermined amount of coolant that is stored apart from the superconductive material until immediately prior to operation of the radiation shield device. To lower the temperature of the superconductive material, the coolant is placed in direct or indirect thermal communication, through conduits or the like, so that the coolant draws heat out of the superconductive material, as known in the art. Specifically, the radiation shield device of the present invention includes liquid helium or liquid neon as the coolant which absorbs thermal energy from the superconductive material as the liquid helium or liquid neon converts from a liquid to a gas (that is subsequently vented), as known in the art. Liquid neon typically cools the superconductive material to 20°K. to 25°K., while liquid helium cools the superconductive material to 5°K. to 10°K.; therefore, a thermal control system comprising liquid helium is preferred because the lower temperatures attained with liquid helium will enable the magnetic field generator to provide a magnetic field with a given magnetic flux density using relatively less superconductive material. Because the radiation shield device of the illustrated embodiment is specifically designed to protect an area of a spacecraft, such as a crew compartment, from CME radiation, which may span a period of a day or two, the thermal control system includes a sufficient amount of coolant to maintain the desired temperature of the superconductive material for a desired period of time. An example of a sufficient amount of coolant for a CME is approximately 2 liters of liquid helium. Further embodiments of the radiation shield device include thermal control systems having alternative types and/or amounts of coolants that are specifically intended for alternative environments, purposes, and/or durations.

Further embodiments of the present invention include a thermal control system that comprises a closed loop system defining a refrigeration cycle. Such a system may be preferred in applications where energy consumption is relatively less critical. The refrigeration cycle of the thermal control system comprises one or more compressors, condensers, heat fins, and the like, as known in the art, that are in thermal communication with the superconductive material to lower the temperature of the superconductive material to a predetermined level. Therefore, a refrigeration cycle will be capable of providing indefinite cooling of the magnetic field generator, presuming the energy to run the refrigeration cycle is available. Still further embodiments of the present invention comprise alternative thermal control systems for controlling the temperature of the superconductive material.

The superconductive material is preferably maintained at a temperature as close as possible to absolute zero to maximize the magnetic flux density of the magnetic field generated by a given electrical current passing through the superconductive material. To generate the magnetic field, the radiation shield device of the present invention lowers the temperature of the superconductive material to a predetermined level and then sends an electrical current of a given amount through the superconductive material. The current will continue through the superconductive material for an extended period of time, as known in the art, based upon various parameters of the superconductive material. Preferably, an electrical current of at least 1,000 Amps is provided to the superconductive material that includes at least 1,000 turns of active flux generation, such that the coil of superconductive material comprises at least 1,000,000 Ampere-turns and more preferably comprises at least 2,000,000 Ampere-turns. Further embodiments of the present invention comprise alternative amounts of electrical current and/or turns of active flux generation to provide a magnetic field having a sufficient magnetic flux density to shield the area encircled by the magnetic field generator.

A second embodiment of the radiation shield device 110 is shown in FIG. 5, wherein the radiation shield device comprises a magnetic shield device 112 to substantially shield the area 136 from the magnetic field. Extended exposure to magnetic fields is arguably harmful to humans, electronic components, and/or other objects, and because the magnetic field generator does produce a magnetic field within the area 36 for the embodiment of FIGS. 2-4 which does not include a magnetic shield device, a magnetic shield device 112 may be provided to substantially shield the area 136 of FIG. 5 from the magnetic field 134. As shown in the graph of FIG. 5, the magnetic shield device 112, when disposed between the magnetic field generator 130 and the area 136 to be shielded from radiation, such as the crew compartment of a spacecraft, reduces the magnetic flux density of the magnetic field 134 to approximately 0 Tesla while providing a magnetic flux density of approximately 1.35 along the outer perimeter of the magnetic field generator, to provide non-limiting examples of magnetic flux densities. The paths of magnetic flux lines are illustrated in FIG. 5 and shown to travel through the magnetic shield device rather than through the area 136.

The magnetic shield device 112 of the radiation shield device 110 of FIG. 5 comprises a layer of high magnetic permeability material that preferably comprises a single layer having at least two of the following materials: nickel, iron, copper, molybdenum, and chromium. One non-limiting example of a high magnetic permeability material is the magnetic shield device 112 of FIG. 5, which comprises a single layer of Mumetal® (also known as Hipernom®, HyMu-80®, and Permalloy) which is available from Goodfellow Corp. of Devon, Penn., among other sources. The layer of the magnetic shield device 112 preferably defines a cross-sectional pattern that is substantially equivalent to, though slightly smaller than, the cross-sectional pattern of the magnetic field generator 130. The magnetic shield device 112 also defines an axial length that is longer than the axial length of the magnetic field generator and preferably defines an axial length that is substantially equivalent to the axial length of the area 136 protected from radiation so that a substantially equivalent volume of area is also shielded from the magnetic field 134. The layer of high magnetic permeability material of FIG. 5 preferably defines a radial thickness of 5 to 10 mm; however, further embodiments of the radiation shield device include magnetic shield devices having alternative thicknesses, alternative numbers of layers, and alternative axial lengths and cross-sectional patterns to shield the area.

For embodiments of the radiation shield device 10 and 110 that are moveable relative to the source of radiation, such as the radiation shield device of a spacecraft which is selectively moveable relative to the sun, e.g., so as to be oriented relative to the sun in a consistent orientation or in a variable orientation, the present invention provides a radiation detection device and method for determining the approach of radiation. For embodiments of the present invention used in spacecraft, the radiation detection device and method comprises an antenna that provides communication with earth-based support. Preferably, the activities of the sun's surface are monitored using the SOHO (Solar and Heliospheric Observatory) or other space-based devices, or even earth-based devices, that communicate warnings, via earth-based analysis and prediction and communicated to the antenna onboard the spacecraft. Typically, such measurements taken proximate the earth provide a 2 to 24 hour warning, depending upon the calculated speed of the radiation, that CME radiation is approaching. Alternatively, the radiation detection device and methods comprise an antenna to communicate directly, or via the earth, with one or more satellites that are approximately located between the sun and the spacecraft and that include radiation detection sensors for detecting radiation that contacts the satellite to provide warning signals to the spacecraft of approaching radiation. Still further embodiments of the present invention include radiation detection devices and methods comprising onboard sensors and processing circuitry for detecting the approach of radiation. Preferably, adequate time is provided to cool the superconductive material, as described above, and start the magnetic field generator, as described above, to provide radiation protection once the radiation arrives. Still further embodiments of the invention comprise alternative radiation detection devices and methods for determining the approach of radiation, either for space exploration applications or other uses.

By determining the approach of radiation, not only can the magnetic field generator be activated in a timely manner, but the radiation shield device can also orient the magnetic field generator, such as a solenoid, relative to the detected radiation, so that a preferred amount of radiation particles are deflected. Such change in orientation of the radiation shield device can be accomplished by moving the entire structure to which the radiation shield device is mounted or by moving the radiation shield device relative to the structure to which it is mounted. The magnetic field generator 130 of FIG. 5 provides optimal radiation protection from radiation approaching along the x-axis and z-axis (not shown) while providing minimal protection from radiation approaching along the y-axis. Therefore, by determining the source of the radiation, such as the sun during a CME event, the spacecraft can be oriented, preferably by processing circuitry, such as a processor or other computing device, in electrical communication with actuating devices to orient the spacecraft, such that the sun is substantially positioned along the x-axis and z-axis of the magnetic field generator 130 to provide optimal radiation protection. Further embodiments of the radiation shield device comprising alternative magnetic field generator configurations may orient the magnetic field generator differently and/or may control the orientation of the magnetic field generator differently. Still further embodiments of the radiation shield device include additional magnetic field generators for additional protection, such as a second generator that is substantially perpendicular to the first generator, to list one non-limiting example.

A spacecraft 200 that includes a radiation shield device 210 of the present invention is illustrated in FIGS. 6 and 7. The spacecraft 200 defines a cylindrical shape having a total axial length of approximately 2 meters and a diameter of approximately 4 meters. The spacecraft 200 is also capped with a hemispherical nose that might not be protected in some embodiments of the present invention. The interior of the spacecraft 200 comprises the area 236 which is protected from radiation by the radiation shield device 210, and may house one or more crew members, such as the two members illustrated in FIG. 6, or may house no crew members. The spacecraft 200 preferably comprises one or more modules of the crew exploration vehicle (CEV) currently being developed for space exploration. The CEV is a multi-element vehicle configuration, which may include both manned and unmanned elements, any of which may be protected by the radiation shield device 210 of the present invention. For example, the spacecraft 200 of FIG. 6 is a crew compartment for the CEV in some embodiments of the present invention, such that the crew compartment is protected from radiation by the radiation shield device 210.

The radiation shield device 210 includes the magnetic field generator 230, which is preferably a solenoid of superconductive material 232, encircling the area 236 at approximately the axial center of the spacecraft. The magnetic field generator 230 may define any radial thickness, and the radial thickness is advantageously minimized at least for reasons of form factor. The radiation shield device 210 also includes a magnetic shield device 212 along the cylindrical portion of the spacecraft 200. The magnetic shield device 212 may define any surface of the spacecraft structure, such as the outer surface as illustrated in FIG. 6.

The radiation shield device 210 of FIG. 6 also includes a thermal control system 250 that may be either an open loop or closed loop system, as described above. If the thermal control system 250 is an open loop system, the coolant lines 252 transfer stored liquid neon or liquid helium to the superconductive material 232 to cool the material. Similarly if the thermal control system 250 is a closed loop system, the coolant lines 252 transfer the refrigerant to and from the compressor and condenser, or other refrigeration components, of the thermal control system. The radiation shield device 210 also includes a radiation detection device and method that comprises an antenna 254 that enables communication with earth-based and/or celestial-based support. The antenna 254 of FIG. 6 is a planar antenna; however, further embodiments of the radiation shield device comprise antennas of alternative configuration, such as parabolic/hyperbolic antennas, horn antennas, or the like. Information received through the antenna 254 is transferred to the terminal 256 which preferably includes a display for a crew member to view the data. The terminal 256 includes a radio transceiver and processing circuitry to determine if radiation is approaching and includes components, such as thrusters or the like, to orient the spacecraft 200 to a desired orientation relative to the sun in the event of a CME.

FIG. 7 (not to scale) illustrates a preferred orientation of the spacecraft 200 relative to the sun 260. The spacecraft 200 is shown traveling between Earth 262 and Mars 264 such that the axis of the spacecraft is substantially perpendicular to the solar ecliptic. As previously discussed, the radiation shield device provides greatest protection along a plane generally perpendicular to the axis of the magnetic field generator; therefore, the axis of the spacecraft 200 of FIGS. 6 and 7 is preferably oriented perpendicular to the solar ecliptic. However, the axis of the spacecraft 200 need only be substantially perpendicular to the line connecting the sun and the spacecraft to provide a preferred amount of protection from CME radiation. Further embodiments of the present invention include alternative spacecraft configurations and alternative radiation shield device configurations.

The present invention also provides methods for manufacturing a radiation shield device that provides radiation protection to an area. The manufacturing method of the embodiments of the invention relating to spacecraft assembly advantageously include assembly techniques and component configurations that minimize the weight and volume of the radiation shield device, particularly in applications where weight and size are important parameters. FIG. 8 is a flow chart illustrating steps 300 through 308 for manufacturing a radiation shield device by one method of the present invention. Step 300 comprises installing a magnetic field generator, such as a solenoid, of superconductive material around the area to be shielded from radiation. Step 302 comprises providing a thermal control system in thermal communication with the superconductive material. Furthermore, step 304 comprises positioning a magnetic shield device between the magnetic field generator and the area to be shielded from radiation. Step 306 comprises providing a radiation detection device. Finally, step 308 comprises providing processing circuitry for controlling the orientation of the magnetic field generator relative to the detected radiation. Further embodiments of the present invention may comprise additional steps, fewer steps, and/or alternative steps to manufacture radiation shield devices of the present invention.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A radiation shield device for providing radiation protection to an area, the radiation shield device comprising:
a magnetic field generator comprising superconductive material for providing a magnetic field around the area to shield the area from radiation, said magnetic field generator defining a central axis extending through the area;
a thermal control system for controlling a temperature of the superconductive material; and
a magnetic shield device disposed within the magnetic field generator and aligned about the central axis for substantially shielding the area from the magnetic field generated by the magnetic field generator, said magnetic shield device extending axially beyond each magnetic field generator that extends thereabout.

2. A radiation shield device according to claim 1 wherein the magnetic field generator comprises a solenoid.

3. A radiation shield device according to claim 1 wherein the magnetic field generator provides a magnetic field having a magnetic flux density of 0.5 to 10 Tesla.

4. A radiation shield device according to claim 1 wherein the superconductive material of the magnetic field generator comprises a coil of magnesium diboride embedded in a copper wire.

5. A radiation shield device according to claim 4 wherein the coil of superconductive material comprises at least 1,000,000 Ampere-turns.

6. A radiation shield device according to claim 1 wherein the thermal control system comprises an open loop system including a coolant from the group consisting of liquid helium and liquid neon.

7. A radiation shield device according to claim 1 wherein the thermal control system comprises a closed loop system defining a refrigeration cycle.

8. A radiation shield device according to claim 1 wherein the magnetic shield device comprises a layer of high magnetic permeability material disposed between the magnetic field generator and the area to be shielded from radiation.

9. A radiation shield device according to claim 8 wherein the layer of high magnetic permeability material comprises an alloy containing at least two of the following materials: nickel, iron, copper, molybdenum, and chromium.

10. A radiation shield device according to claim 1 wherein the magnetic shield device extends axially in both directions beyond each magnetic field generator that extends thereabout.

11. A radiation shield device for providing radiation protection to an area, the radiation shield device comprising:
a solenoid of superconductive material for providing a magnetic field around the area to shield the area from radiation, the solenoid defining a diameter and an axial length such that the axial length of the solenoid is substantially smaller than the diameter;
a thermal control system for controlling a temperature of the superconductive material; and a magnetic shield device disposed within the solenoid for substantially shielding the area from the magnetic field generated by the solenoid, said magnetic shield device extending axially in both directions beyond each solenoid that extends thereabout.

12. A radiation shield device according to claim 11 wherein the solenoid of the superconductive material provides a magnetic field having a magnetic flux density of 0.5 to 10 Tesla.

13. A radiation shield device according to claim 11 wherein the superconductive material of the solenoid comprises a coil of magnesium diboride embedded in a copper wire.

14. A radiation shield device according to claim 13 wherein the coil of superconductive material comprises at least 1,000,000 Ampere-turns.

15. A radiation shield device according to claim 11 wherein the thermal control system comprises an open loop system including a coolant from the group consisting of liquid helium and liquid neon.

16. A radiation shield device according to claim 11 wherein the thermal control system comprises a closed loop system defining a refrigeration cycle.

17. A radiation shield device according to claim 11 wherein the magnetic shield device comprises a layer of high magnetic permeability material disposed between the solenoid of superconductive material and the area to be shielded from radiation.

18. A radiation shield device according to claim 17 wherein the layer of high magnetic permeability material comprises an alloy containing at least two of the following materials: nickel, iron, copper, molybdenum, and chromium.

19. A radiation shield device according to claim 11 wherein the solenoid defines a central axis and the magnetic shield device is aligned about the central axis.

20. A method of manufacturing a radiation shield device that provides radiation protection to an area, the method comprising the steps of:
   installing a solenoid of superconductive material around the area to be shielded from radiation, the solenoid defining a diameter and an axial length such that the axial length of the solenoid is substantially smaller than the diameter;
   providing a thermal control system in thermal communication with the superconductive material; and
   positioning a magnetic shield device between the solenoid of superconductive material and the area to be shielded from radiation such that the magnetic shield device extends axially in both directions beyond each solenoid that extends thereabout.

21. A method according to claim 20 wherein providing the thermal control system comprises installing a predetermined amount of coolant from the group consisting of liquid helium and liquid neon for selective thermal communication between the coolant and the superconductive material.

22. A method according to claim 20 wherein providing the thermal control system comprises installing a refrigeration cycle in thermal communication with the superconductive material.

23. A method according to claim 20 wherein the solenoid defines a central axis, and wherein positioning the magnetic shield device comprises aligning the magnetic shield device about the central axis of the solenoid.

24. A method of manufacturing a radiation shield device that provides radiation protection to an area, the method comprising the steps of:
   installing a solenoid of superconductive material around the area to be shielded from radiation, the solenoid defining a diameter and an axial length such that the axial length of the solenoid is substantially smaller than the diameter;
   providing a thermal control system in thermal communication with the superconductive material;
   providing a radiation detector for determining the approach of radiation; and
   providing processing circuitry for controlling the orientation of the solenoid of superconductive material relative to the detected radiation.

* * * * *